United States Patent
Shibagaki et al.

(10) Patent No.: US 8,527,152 B2
(45) Date of Patent: Sep. 3, 2013

(54) VEHICLE CONTROL DEVICE

(75) Inventors: Toshimasa Shibagaki, Aichi (JP); Shinji Hasegawa, Aichi (JP); Noriyasu Onishi, Aichi-ken (JP); Tomoo Kakegawa, Aichi-ken (JP); Hiroko Murakami, Toyota (JP)

(73) Assignees: Kabushiki Kaisha Tokai Rika Denki Seisakusho, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 1432 days.

(21) Appl. No.: 11/921,059

(22) PCT Filed: Aug. 4, 2006

(86) PCT No.: PCT/JP2006/315516
§ 371 (c)(1),
(2), (4) Date: Nov. 26, 2007

(87) PCT Pub. No.: WO2007/020821
PCT Pub. Date: Feb. 22, 2007

(65) Prior Publication Data
US 2009/0043457 A1 Feb. 12, 2009

(30) Foreign Application Priority Data
Aug. 18, 2005 (JP) .................................. 2005-237461

(51) Int. Cl.
*G06F 7/00* (2006.01)
*G01M 17/00* (2006.01)

(52) U.S. Cl.
USPC ...................... 701/49; 701/3; 701/22; 701/32

(58) Field of Classification Search
None
See application file for complete search history.

(56) References Cited

U.S. PATENT DOCUMENTS

| | | | | |
|---|---|---|---|---|
| 4,688,036 A | * | 8/1987 | Hirano et al. | 340/5.62 |
| 4,761,645 A | * | 8/1988 | Mochida | 340/5.62 |
| 6,100,792 A | * | 8/2000 | Ogino et al. | 340/426.25 |
| 6,218,929 B1 | * | 4/2001 | Furuta et al. | 340/5.2 |
| 6,670,883 B1 | * | 12/2003 | Asakura et al. | 340/5.61 |
| 6,958,675 B2 | * | 10/2005 | Maeda et al. | 340/5.61 |
| 7,193,334 B2 | * | 3/2007 | Hiramitsu et al. | 307/10.1 |
| 7,199,710 B2 | * | 4/2007 | Hiramitsu et al. | 340/539.26 |
| 7,336,151 B2 | * | 2/2008 | Ueda et al. | 340/5.72 |
| 2002/0105411 A1 | | 8/2002 | Maeda et al. | |
| 2003/0151873 A1 | | 8/2003 | Asada | |
| 2004/0004398 A1 | | 1/2004 | Nagasaka et al. | |
| 2004/0113754 A1 | * | 6/2004 | Suyama et al. | 340/5.61 |

(Continued)

FOREIGN PATENT DOCUMENTS

| | | |
|---|---|---|
| DE | 101 64 558 A1 | 8/2002 |
| GB | 2 353 075 A | 2/2001 |
| JP | 6-39637 | 5/1994 |
| JP | 2001-311333 | 11/2001 |
| JP | 2004-162522 | 6/2004 |
| JP | 2005-105691 | 4/2005 |

*Primary Examiner* — Ian Jen
(74) *Attorney, Agent, or Firm* — Patterson Thuente Pedersen, P.A.

(57) ABSTRACT

A vehicle control device has first and second transmission circuits that communicate by radio with a portable unit and also has a control section that, when the portable unit is confirmed to be correct, engages in a permission mode that permits the start of an engine. The first and second transmission circuits transmit first and second request signals from first and second transmission antennas to first and second communicatable areas respectively. When a back door is detected to be open, the control section does not permit the start of the engine even if an ID code signal is returned from the portable unit in response to the second request signal.

19 Claims, 3 Drawing Sheets

(56) References Cited

U.S. PATENT DOCUMENTS

| | | |
|---|---|---|
| 2004/0150512 A1 | 8/2004 | Yoshikawa |
| 2004/0236479 A1* | 11/2004 | Hattori .............................. 701/2 |
| 2005/0020212 A1* | 1/2005 | Hiramitsu et al. ............ 455/41.2 |
| 2005/0029871 A1* | 2/2005 | Mori et al. .................... 307/10.3 |
| 2005/0258686 A1* | 11/2005 | Hiramitsu et al. ............ 307/10.1 |
| 2006/0061459 A1* | 3/2006 | Kawamura et al. ...... 340/426.36 |

* cited by examiner

VEHICLE CONTROL DEVICE

TECHNICAL FIELD

The present invention relates to a vehicle control device that enables driving of a vehicle engine through wireless communication.

BACKGROUND ART

Nowadays, in addition to improving basic performance and safety, automobiles are required to improve convenience. In order to satisfy such demands, an engine drive control system has been proposed in which automatic wireless communication is performed between a portable device carried by a user and an in-vehicle vehicle control device, and the starting of the engine is enabled when wireless communication is established (refer to, for example, patent document 1 and patent document 2).

In a conventional engine drive control system, the vehicle control device intermittently outputs a request signal through wireless communication. A transmittable range of the request signal is set to be within the passenger compartment. When a user (driver) carrying the portable device, which has a communication function, enters the passenger compartment, the portable device receives the request signal. In response to the request signal, the portable device wirelessly outputs an ID code signal containing an ID code that is set or registered in the portable device. The vehicle control device receives the ID code signal and authenticates the ID code contained in the ID code signal of the portable device with an ID code set or registered in the vehicle control device. The vehicle control device determines that communication has been established when the ID codes are identical and enables the engine to be started. In this state, the engine is started by operating an operation unit arranged in the passenger compartment. A driver can start the engine by just entering the vehicle and operating the operation unit.

In the conventional engine drive control system, however, the passenger compartment may include a region in which communication between the portable device and the vehicle control device is impossible. When the portable device enters such a non-communicable region, the user cannot start the engine even through the portable device is located in the passenger compartment. This is inconvenient. Accordingly, improvements have been made so that the request signal can be transmitted throughout the passenger compartment by arranging a plurality of transmission antennas that output the request signal in the passenger compartment or by adjusting the directivity of a transmission antenna.

The request signal output throughout the passenger compartment from the transmission antennas, the quantity and directivity of which have been adjusted, is blocked by the door when the door is closed and is not transmitted outside the vehicle. However, when the door is open, the request signal may be transmitted out of the vehicle. When the user is carrying the portable device near the open door, mutual communication may be established between the portable device and the vehicle control device even though the user is outside the vehicle such that starting of the engine is enabled. In the state in which starting of the engine is enabled, a third person may start the engine against the will of the user when, for example, the user is loading baggage at the rear of the vehicle in a state in which a back door is open. Improvements in security must thus be made in the conventional engine drive control system.

Patent document 2 discloses a technique for changing the transmission region of the request signal in the passenger compartment when the rearmost seat is in a stored state and an upright state to prevent the request signal from being transmitted out of the vehicle. The security is improved by keeping the rearmost seat in the stored state.

[Patent document 1] Japanese Laid-Open Patent Publication No. 2001-311333
[Patent document 2] Japanese Laid-Open Patent Publication No. 2005-105691

SUMMARY OF THE INVENTION

However, when the user is loading baggage from the back door when the rearmost seat is in the upright state, the request signal is transmitted out of the vehicle even with the technique of patent document 2. Thus, improvements in security must be made to the conventional engine drive control system.

It is an object of the present invention to provide a vehicle control device that improves the security level of the vehicle.

To achieve the above object, an aspect of the invention recited in claim 1 is a vehicle control device including a communication means for performing wireless communication with a portable device. A control means controls the communication performed by the communication means, communicates with the portable device to authenticate the portable device, and enters an enable mode for enabling starting of an engine or normal driving of the vehicle when the portable device is authenticated. The control means is configured to detect whether or not a door of the vehicle is open and refrain from entering the enable mode when that the door is open.

An aspect of the invention recited in claim 2 is in that the communication means includes a plurality of communication antennas respectively forming a plurality of different communicable regions in a passenger compartment. The control means, when detecting that the door is open, skips entering the enable mode even when communication is performed between the portable device and the one of the communication antennas of which the communicable region includes the vicinity of the open door and disables the starting of the engine or restricts normal driving of the vehicle.

An aspect of the invention recited in claim 3 is in that the plurality of communication antennas includes a communication antenna of which the communicable region is located at a rear part of the passenger compartment.

An aspect of the invention recited in claim 4 is in that the communication means is one of the plurality of communication means respectively forming a plurality of different communicable regions in a passenger compartment. The control means, when detecting that the door is open, stops communication between the portable device and the communication means of which the communicable region corresponds to the open door.

An aspect of the invention recited in claim 5 is in that the communication means includes a plurality of communication antennas respectively forming a plurality of different communicable regions in a passenger compartment. The control means, when detecting that the door is open, lowers an output level of the communication antenna of which the communicable region corresponds to the open door.

An aspect of the invention recited in claim 6 is in that the communication means includes a main antenna forming a first communicable region including a driver's seat in the passenger compartment and a sub-antenna forming a second communicable region excluding the driver's seat in the passenger compartment. The control means, when communication is established between the main antenna and the portable device, enters the enable mode even when detecting that the door is open.

An aspect of the invention recited in claim 7 is in that the vehicle includes a plurality of doors. The communication means includes a plurality of communication antennas respectively associated with the plurality of doors. The control means, when detecting that the door is open, skips entering the enable mode and disables the starting of the engine or restricts normal driving of the vehicle.

An aspect of the invention recited in claim 8 is in that the vehicle has a plurality of doors including the driver's seat door. The control means enters the enable mode when detecting that only the driver's seat is open.

An aspect of the invention recited in claim 9 is in that the control means narrows the communicable region when detecting that the door is open.

An aspect of the invention recited in claim 10 is in that the door is distant from a driver's seat, and the control means detects whether or not the distant door is opened.

An aspect of the invention recited in claim 11 is a vehicle control device, installed in a vehicle including an engine, a driver's seat, and a door distant from the driver's seat, for wirelessly communicating with a portable device. The vehicle control device includes a communication means for communicating with the portable device. The communication means outputs a first request signal within a first communicable region that is near the driver's seat and outputs a second request signal within a second communicable region that is distant from the driver's seat. A control means, connected to the communication means, provides an output command to the communication means to selectively output one of the first request signal and the second request signal. The control means checks, when an ID code is returned from the portable device in response to the first request signal, whether the ID code is authentic, enters an enable mode when the ID code is authentic and enables starting of the engine or normal driving of the vehicle, detects whether or not the door is closed when the ID code is returned from the portable device in response to the second request signal, and skips entering the enable mode when the door is not closed.

An aspect of the invention recited in claim 12 is in that the control means skips entering the enable mode when detecting that the door is open and disables starting of the engine or restricts normal driving of the vehicle.

An aspect of the invention recited in claim 13 is in that the control means checks whether or not the ID code returned from the portable device in response to the second request signal is authentic when detecting that the door is closed, and enters the enable mode enabling starting of the engine or normal driving of the vehicle when the ID code is authentic.

The operation in accordance with the present invention will now be described.

For example, when a user who is carrying the portable device is loading or unloading baggage in a state in which a door at the rear of the vehicle is open, the communicable region is expanded out of the open door. This may establish communication between the portable device and the vehicle control device outside the vehicle. However, with the inventions recited in claims 1, 7, and 9, the vehicle control device disables the starting of the engine or normal driving of the vehicle when the door is opened. Thus, the vehicle will not be driven by an unauthorized third person when such a task is being performed.

With the invention recited in claim 2, communication between the portable device and any one of the communication antennas except for the one of which communicable region includes the vicinity of the door that is open is performed in a normal manner even when detecting that the door is open, and the starting of the engine is enabled when the communication is established. Normally, the communicable region between the communication antenna and the portable device may expand out of the vehicle mainly when the door near that communicable region is open. Thus, if the starting of the engine or normal driving of the vehicle is disabled based on the communication between the portable device and the communication antenna that forms a communicable region near the open door, the vehicle is prevented from being driven by an unauthorized third person during the task described above. The starting of the engine or normal driving of the vehicle based on communication between the portable device and other communication antennas is enabled. This ensures high convenience.

With the inventions recited in claims 3, 8, and 10, when a door at the rear of the vehicle (e.g., rear seat door or back door) is open and the user who is carrying the portable device is outside the door, the vehicle is prevented from being driven by an unauthorized third person.

With the invention described in claim 4, communication is not performed between the communication means that corresponds to the open door and the portable device. Thus, starting of the engine is not enabled even if the portable device is arranged in the communicable region of the communication means. Furthermore, since communication is not performed between the portable device and the communication means, power consumption of the portable device and the vehicle control device is also reduced.

With the inventions recited in claims 5 and 9, the communicable region is prevented from being expanded to a wide region outside the open door. This improves the security of the vehicle.

With the invention recited in claim 6, starting of the engine and normal driving of the vehicle are not restricted even when the door is detected as being open when communication is established between the main antenna and the portable device. Normal functions of the vehicle will not be restricted as long as the user is carrying the portable device near the driver's seat. Thus, convenience of the vehicle is not affected.

With the inventions recited in claims 11 to 13, a high security level and convenience are both obtained.

BEST MODE FOR CARRYING OUT THE INVENTION

Figure 2A:
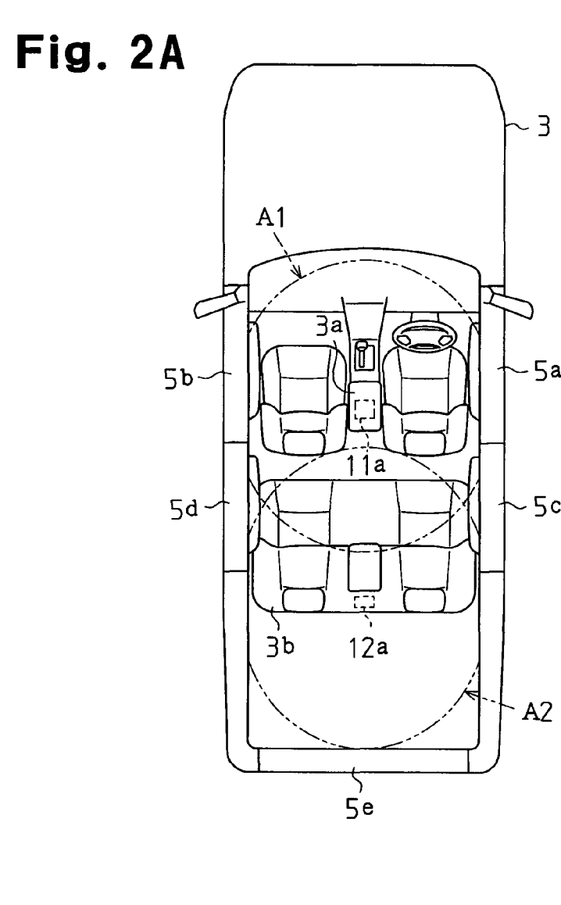
FIG. 2 is a plan view showing a vehicle incorporating the vehicle system of the preferred embodiment, in which (a) shows a state in which a back door is closed, and (b) shows a state in which the back door is open.
Figure 2B:
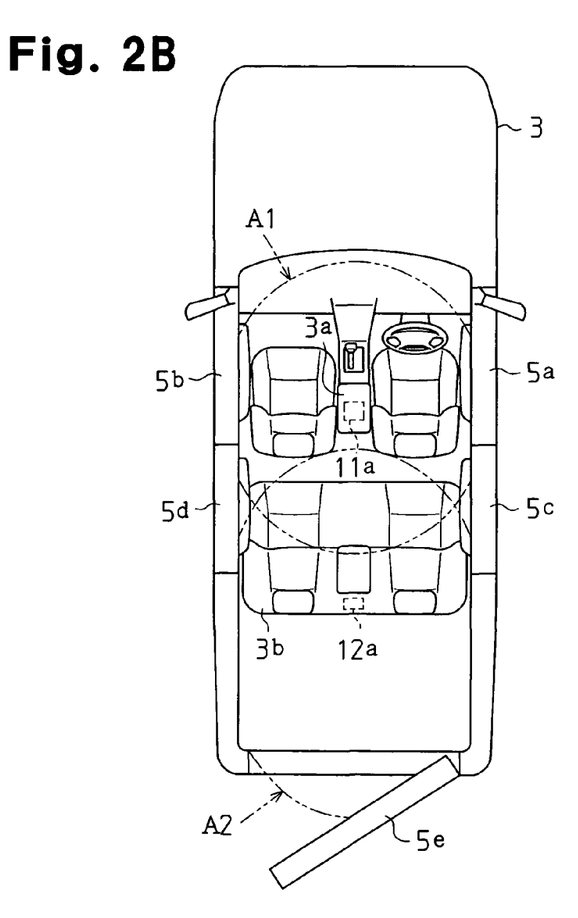
Figure 3:
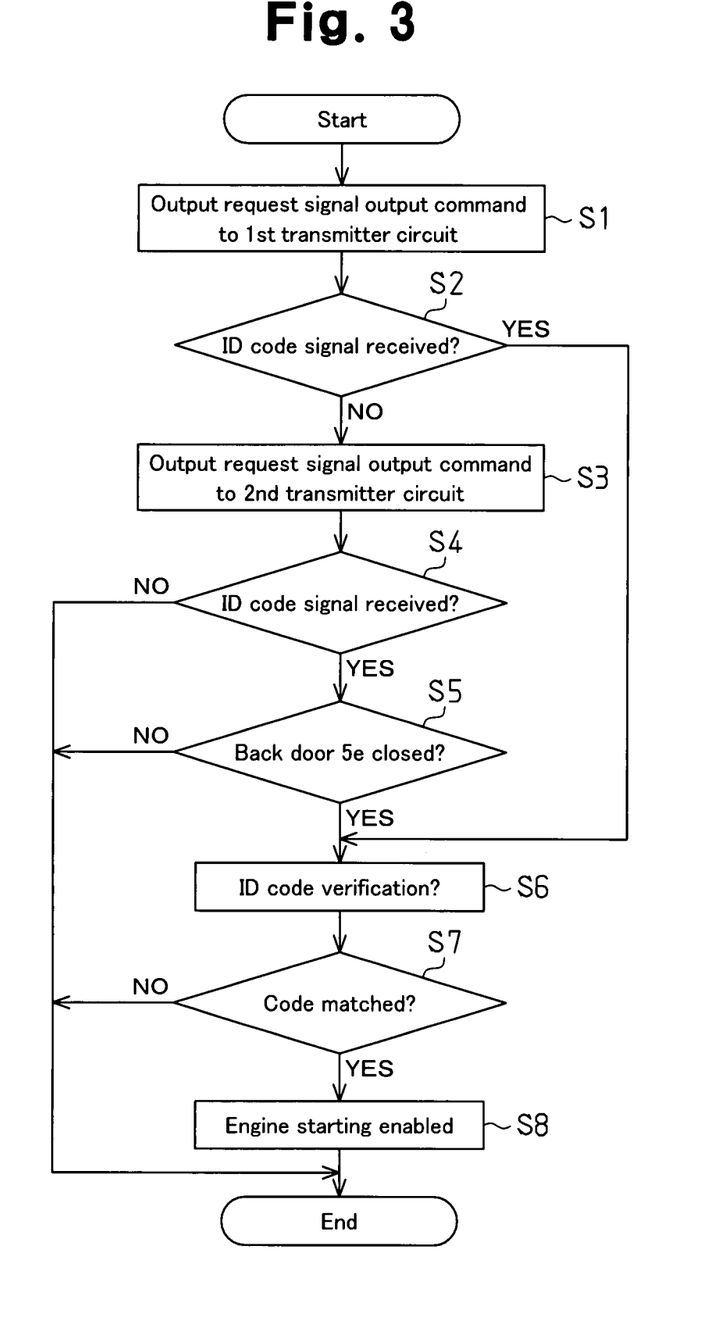
FIG. 3 is a flowchart showing processes performed by a control unit of FIG. 1.

A vehicle control system including a vehicle control device according to a preferred embodiment of the present invention will now be described in detail with reference to FIGS. 1 to 3.

Figure 1:
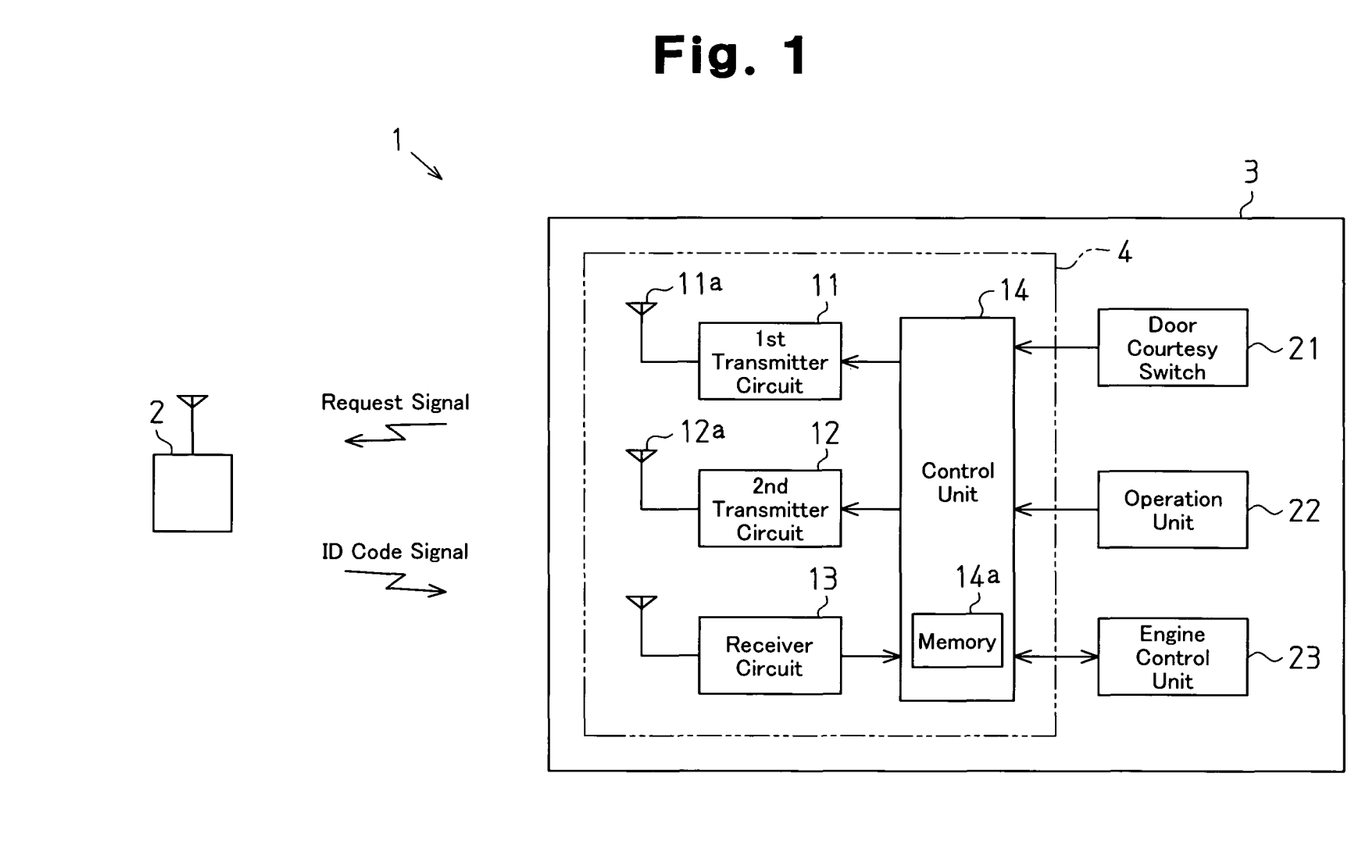
FIG. 1 is a schematic block diagram of a vehicle control system according to a preferred embodiment of the present invention.

As shown in FIG. 1, a vehicle control system 1 includes a portable device 2, which is carried by a user, and a vehicle control device 4, which is arranged in a vehicle 3.

The portable device 2 has a wireless communication function. When receiving a request signal transmitted from the vehicle control device 4, the portable device 2 wirelessly outputs an ID code signal (response signal) containing an ID code set or registered in the portable device 2 in advance.

The vehicle control device 4 includes a first transmitter circuit 11, a second transmitter circuit 12, a receiver circuit 13, and a control unit 14. The transmitter circuits 11 and 12 and the receiver circuit 13 are electrically connected to the control unit 14. The first transmitter circuit 11, the second transmitter circuit 12, and the receiver circuit 13 function as a communication means. The control unit 14 functions as a control means.

The first transmitter circuit 11 is connected to a first transmission antenna 11a. The second transmitter circuit 12 is connected to a second transmission antenna 12a. The first and second transmitter circuits 11 and 12 generate radio waves (request signal) having a predetermined frequency (e.g., 134 kHz) by modulating a request signal output command provided from the control unit 14. Then, the first and second transmitter circuits 11 and 12 respectively transmit the radio waves from the antennas 11a and 12a. The first transmission antenna 11a functions as a communication antenna and a main antenna. The second transmission antenna 12a functions as a communication and a sub-antenna. The first transmission antenna 11a and the second transmission antenna 12a are included in the communication means.

The positions and the transmission regions of the first transmission antenna 11a and the second transmission antenna 12a will be described with reference to FIGS. 2(a) and 2(b). The first transmission antenna 11a, which is arranged in a center console 3a in the passenger compartment of the vehicle 3, transmits the request signal to a passenger compartment region (front region) A1 that includes the driver's seat. The second transmission antenna 12a, which is arranged in the middle portion of a rear seat 3b in the passenger compartment of the vehicle 3, transmits the request signal within a compartment region (rear region) A2 that excludes at least the driver's seat. The output region of the first transmission antenna 11a differs from that of the second transmission antenna 12a. The transmission antennas 11a and 12a communicate with the portable device 2 in different communicable regions. In this specification, the radio wave selectively output within the front region A1 may be referred to as a first request signal, and the radio wave selectively output within the rear region A2 may be referred to as a second request signal. Alternatively, the radio wave selectively output within an output region near the driver's seat may be also referred to as the first request signal, and the radio wave selectively output within an output region distant from the driver's seat may be also referred to as the second request signal.

In a state in which the doors (driver's seat door 5a, front passenger door 5b, rear seat doors 5c and 5d, and back door 5e) of the vehicle 3 are all closed, the request signal is transmitted to only the inside of the passenger compartment of the vehicle 3 and is not transmitted out of the vehicle. In other words, the request signal is transmitted from the two transmission antennas 11a and 12a within the widest possible range in the passenger compartment of the vehicle 3.

The output level of the request signal transmitted from each of the transmission antennas 11a and 12a is set so that the transmission region of the request signal in the passenger compartment of the vehicle 3 is as wide as possible. Thus, the request signal is also slightly transmitted out of the open back door 5e, as shown in FIG. 2(b).

The receiver circuit 13 is arranged at a predetermined location (not shown) in the passenger compartment of the vehicle 3. When receiving the ID code signal transmitted from the portable device 2, the receiver circuit 13 demodulates the ID code signal to a pulse signal. Then, the receiver circuit 13 provides the pulse signal to the control unit 14.

The control unit 14 includes a CPU, a ROM, a RAM, and the like (none shown). The control unit 14 may include a non-volatile memory 14a. The non-volatile memory 14a records the ID code set for the authentic, or approved, portable device 2. The control unit 14 is electrically connected to a door courtesy switch 21, an operation unit 22, and an engine control unit 23.

The door courtesy switch 21 detects an open state and closed state of each of the doors 5a to 5e and provides a detection signal to the control unit 14. The operation unit 22, which is arranged near the driver's seat, includes an engine switch for starting and stopping the engine. The operation unit 22 generates an operation signal when operated and provides the operation signal to the control unit 14.

The engine control unit 23 drives an engine starter in response to an engine start command signal provided from the control unit 14. Further, the engine control unit 23 starts the engine by performing fuel ejection control, ignition control, or the like. The engine control unit 23 detects the driving state of the engine based on ignition pulses, alternator output, or the like and provides a complete ignition signal to the control unit 14 when the engine is being driven.

The control unit 14 operates in an engine start disabling mode (restriction mode) and an engine start enabling mode (enablement mode). In the engine start disabling mode, the control unit 14 does not provide the engine start command signal to the engine control unit 23 even when receiving an operation signal instructing the starting of the engine (start operation signal) from the operation unit 22. The engine thus cannot be started when the control unit 14 is in the engine start disabling mode. In the engine start enabling mode, the control unit 14 provides the engine start command signal to the engine control unit 23 when receiving the start operation signal from the operation unit 22 to start the engine. Normally, the control unit 14 is in the engine start disabling mode. The control unit 14 performs communication control with the portable device 2 in accordance with a control program recorded in the ROM or the like. When predetermined conditions are satisfied, the control unit 14 switches to the engine start enabling mode.

The communication control performed with the portable device 2 by the control unit 14 will now be described with reference to the flowchart of FIG. 3.

In step S1, the control unit 14 provides a request signal output command to the first transmitter circuit 11. The control unit 14 does not provide the request signal output command to the second transmitter circuit 12 in step S1. Therefore, the request signal is transmitted only within the communicable region A1.

In step S2, the control unit 14 determines whether or not the ID code signal is received from the portable device 2. In other words, the control unit 14 determines whether or not the ID code signal has been returned from the portable device 2 in response to the request signal transmitted from the first transmission antenna 11a. If the ID code signal is not received in step 2, the process proceeds to step S3. If the ID code signal is received in step 2, the process proceeds to step S6.

In step S3, the control unit 14 provides the request signal output command to the second transmitter circuit 12. The control unit 14 does not provide the request signal output command to the first transmitter circuit 11 in step S3. Therefore, the request signal is transmitted only within the communicable region A2.

In step S4, the control unit 14 determines whether or not the ID code signal is received from the portable device 2. In other words, the control unit 14 determines whether or not the ID code signal has been returned from the portable device 2 in response to the request signal transmitted from the second transmission antenna 12a. If the ID code signal is not received in step 4, the process is terminated. If the ID code signal is received in step 4, the process proceeds to step S5.

In step S5, the control unit 14 determines whether or not the back door 5e is closed. If the back door 5e is open, the process is terminated. If the back door is closed, the process proceeds to step S6.

In step S6, the control unit 14 compares the ID code in the ID code signal received from the portable device 2 and the ID code recorded in the memory 14a to perform ID code verification.

When receiving the ID code from the portable device 2 in response to the first request signal, the control unit 14 performs the ID code verification regardless of the state of the back door 5e. When receiving the ID code from the portable device 2 in response to the second request signal, the control unit 14 performs the ID code verification when the back door 5e is closed but does not perform the ID code verification if the back door 5e is open.

If the ID codes match in step S7, the control unit 14 determines that communication is established with the authentic portable device 2 and enables the engine to start in step S8. If the ID codes do not match in step S7, the process is terminated.

The preferred embodiment has the advantages described below.

(1) When the back door 5e of the vehicle 3 is open, the starting of the engine is disabled even if an ID code is received by the vehicle control device 4 from the portable device 2 in response to the second request signal. For instance, when the user who is carrying the portable device 2 outside the back door 5e opens the back door 5e to load or unload baggage, the portable device 2 receives the second request signal outside the vehicle and returns the ID code in response to the second request signal. This establishes communication between the portable device 2 and the vehicle control device 4. However, the vehicle control device 4 will not enter the engine start enabling mode even though communication is established since the back door 5e is open. Normal driving of the vehicle is thus disabled, and an unauthorized third person is prevented from driving the vehicle 3 when the user is working outside the vehicle. Therefore, the vehicle control device 4 of the preferred embodiment improves the security level of the vehicle 3. Furthermore, since the request signal is transmitted to the widest possible transmission region in the passenger compartment of the vehicle 3 when the doors are in the normal state, communication between the portable device 2 and the vehicle control device 4 is certainly established in the passenger compartment of the vehicle 3. Therefore, the vehicle control device 4 enhances convenience of the vehicle 3.

(2) The control unit 14 enables the starting of the engine even if the back door 5e is open when receiving the ID code signal from the portable device 2 in response to the first request signal transmitted from the first transmission antenna 11a. Thus, when the user who is carrying the portable device 2 is near the driver's seat of the vehicle 3, normal driving of the vehicle is enabled regardless of whether the back door 5e is open or closed. Therefore, the vehicle control device 4 improves the convenience of the vehicle 3.

(3) When the back door 5e is open, the control unit 14 does not perform the ID code verification on the ID code signal received from the portable device 2 in response to the second request signal and thus does not enable the starting of the engine. That is, even if the back door 5e is open, the control unit 14 outputs the second request signal. As a result, the control unit 14 can recognize whether or not the portable device 2 is located near the vehicle 3.

The preferred embodiment may be modified as described below.

In the preferred embodiment, the vehicle control device 4 disables the starting of the engine when receiving the ID code signal from the portable device 2 in response to the second request signal when the back door 5e is open. Instead of disabling the starting of the engine, the vehicle control device 4 may execute control for restricting the driving functions of the vehicle (e.g., restriction of maximum speed, restriction of drivable distance, restriction of changes in gearshift positions, control for disabling normal driving travel such as the stopping of the engine in response to driving operations). In this case, the warming of the engine and the operation of the air conditioner and car audio equipment may be allowed even if the back door 5e is open since the engine can be driven. This increases the convenience of the vehicle 3.

In the preferred embodiment, when the back door 5e is open, the control unit 14 does not perform the ID code verification on the ID code signal received from the portable device 2 in response to the second request signal and thus does not enable the starting of the engine. Instead, the control unit 14 may be configured to perform the ID code verification but enter a restriction mode when the back door 5e is open. Alternatively, the control unit 14 may be configured so that it does not output the second request signal when the back door 5e is open. In particular, when the control unit 14 is configured so that is does not output the second request signal when the back door 5e is open, communication between the portable device 2 in the vicinity of the back door 5e and the vehicle control device 4 will not be established. This ensures that the engine will not be started when the portable device 2 is located near the back door 5e. This also reduces power consumption of the portable device 2 and the vehicle control device 4.

In the preferred embodiment, the engine can be started even if the back door 5e is open when communication is established between the portable device 2 and the vehicle control device 4 in response to the first request signal. Instead, the starting of the engine may be disabled when the back door 5e is open even when communication is established between the portable device 2 and the vehicle control device 4 in response to the first request signal.

In the preferred embodiment, the vehicle control device 4 includes two transmitter circuits 11 and 12 and two transmission antennas 11a and 12a. Instead of the two transmitter circuits 11 and 12 and the two transmission antennas 11a and 12a, a single transmitter circuit and a single transmission antenna may be used. In this case, the single transmission antenna is preferable arranged in the central portion of the passenger compartment of the vehicle 3. The single transmitter circuit and the single transmission antenna may change the output level and output direction of the request signal so that the request signal is output within a selected one of a plurality of different communicable regions including at least a region that is close to the driver's seat and a region that is distant from the driver's seat. Furthermore, in place of the two transmitter circuits 11 and 12 and the two transmission antennas 11a and 12a, three or more transmitter circuits and three or more transmission antennas may be used. In particular, a plurality of transmitter circuits and a plurality of transmission antennas respectively corresponding to the plurality of doors 5a to 5e may be used. In this case, the control unit 14 may disable the starting of the engine only when receiving the ID code signal from the portable device 2 in response to a request signal transmitted from the transmission antenna associated with the one of the doors 5a to 5e that is open.

If the doors 5a to 5e (or only the back door 5e) are open, the vehicle control device 4 may lower the output level of the request signal transmitted by the transmission antennas 11a and 12a. In this case, the transmission of the request signal out of the vehicle from the open door is suppressed.

In the preferred embodiment, the vehicle control device 4 disables the starting of the engine only if the ID code signal is received from the portable device 2 in response to the second request signal when the back door 5e is open. However, the vehicle control device 4 may disable the starting of the engine if the ID code signal is received from the portable device 2 in response to the second request signal not only when the back door 5e is open but also when the rear seat doors 5c and 5d are opened. Also, the vehicle control device 4 may disable the starting of the engine when the ID code signal is received from the portable device 2 in response to the first request signal when the driver's seat door 5a and the front passenger door 5b are open. In other words, the vehicle control device 4 may disable the starting of the engine based on the result of communication with a transmission antenna, the request signal transmission region of which includes the vicinity of open doors.

The invention claimed is:

1. A vehicle control device comprising:
a communication circuit configured to perform wireless communication with a portable device; and
a controller configured to control the communication performed by the communication circuit, communicating with the portable device to authenticate the portable device, and entering an enable mode for enabling starting of an engine or normal driving of the vehicle when the portable device is authenticated, wherein
the controller is further configured to detect whether or not a door of the vehicle is open while a request signal is output within a passenger compartment of the vehicle, to be received by the portable device within the passenger compartment of the vehicle, from the communication circuit and to refrain from entering the enable mode when detecting that a timing transmission of the request signal within the passenger compartment at least partially overlaps with a period in which the door is open while the request signal is output within the passenger compartment of the vehicle from the communication circuit.

2. The vehicle control device according to claim 1, wherein the communication circuit includes a plurality of communication antennas respectively forming a plurality of different communicable regions in a passenger compartment; and
the controller, when detecting that the door is open, skips entering the enable mode even when communication is performed between the portable device and the one of the communication antennas of which the communicable region includes the vicinity of the open door and disables the starting of the engine or restricts normal driving of the vehicle.

3. A vehicle control device comprising:
a communication circuit configured to perform wireless communication with a portable device; and
a controller configured to control the communication performed by the communication circuit, communicating with the portable device to authenticate the portable device, and entering an enable mode for enabling starting of an engine or normal driving of the vehicle when the portable device is authenticated, wherein:
the controller is further configured to detect whether or not a door of the vehicle is open while a request signal is output within a passenger compartment of the vehicle, to be received by the portable device within the passenger compartment of the vehicle, from the communication circuit and to refrain from entering the enable mode when detecting that a timing transmission of the request signal within the passenger compartment at least partially overlaps with a period in which the door is open while the request signal is output within the passenger compartment of the vehicle from the communication circuit;
the communication circuit includes a plurality of communication antennas respectively forming a plurality of different communicable regions in a passenger compartment;
the controller, when detecting that the door is open, skips entering the enable mode even when communication is performed between the portable device and the one of the communication antennas of which the communicable region includes the vicinity of the open door and disables the starting of the engine or restricts normal driving of the vehicle; and
the plurality of communication antennas includes a communication antenna of which the communicable region is located at a rear part of the passenger compartment.

4. A vehicle control device comprising:
a communication circuit configured to perform wireless communication with a portable device; and
a controller configured to control the communication performed by the communication circuit, communicating with the portable device to authenticate the portable device, and entering an enable mode for enabling starting of an engine or normal driving of the vehicle when the portable device is authenticated, wherein:
the controller is further configured to detect whether or not a door of the vehicle is open;
the communication circuit is one of the plurality of communication circuit respectively forming a plurality of different communicable regions in a passenger compartment; and
the controller, when detecting that the door is open, stops communication between the portable device and the communication circuit of which the communicable region corresponds to the open door.

5. A vehicle control device comprising:
a communication circuit configured to perform wireless communication with a portable device; and
a controller configured to control the communication performed by the communication circuit, communicating with the portable device to authenticate the portable device, and entering an enable mode for enabling starting of an engine or normal driving of the vehicle when the portable device is authenticated, wherein:
the controller is further configured to detect whether or not a door of the vehicle is open;
the communication circuit includes a plurality of communication antennas respectively forming a plurality of different communicable regions in a passenger compartment; and
the controller, when detecting that the door is open, lowers an output level of the communication antenna of which the communicable region corresponds to the open door.

6. The vehicle control device according to claim 1, wherein:
the communication circuit includes a main antenna forming a first communicable region including a driver's seat in the passenger compartment and a sub-antenna forming a second communicable region excluding the driver's seat in the passenger compartment; and the controller, when communication is established between the main antenna and the portable device, enters the enable mode even when detecting that the door is open.

7. The vehicle control device according to claim 1, wherein:
the vehicle includes a plurality of doors;
the communication circuit includes a plurality of communication antennas respectively associated with the plurality of doors; and
the controller, when detecting that the door is open, skips entering the enable mode and disables the starting of the engine or restricts normal driving of the vehicle.

8. The vehicle control device according to claim 1, wherein:
the vehicle has a plurality of doors including a driver's seat door; and
the controller enters the enable mode when detecting that only the driver's seat door is open.

9. A vehicle control device comprising:
a communication circuit configured to perform wireless communication with a portable device; and
a controller configured to control the communication performed by the communication circuit, communicating with the portable device to authenticate the portable device, and entering an enable mode for enabling starting of an engine or normal driving of the vehicle when the portable device is authenticated, wherein:
the controller is further configured to detect whether or not a door of the vehicle is open; and
the controller narrows the communicable region when detecting that the door is open.

10. The vehicle control device according to claim 1, wherein the door is distant from a driver's seat, and the controller detects whether or not the distant door is opened.

11. A vehicle control device for installation in a vehicle including an engine, a driver's seat, and a door distant from the driver's seat, for wirelessly communicating with a portable device, the vehicle control device comprising:
a communication circuit configured to perform with the portable device, the communication circuit outputting a first request signal within a first communicable region that is near the driver's seat and outputting a second request signal within a second communicable region that is distant from the driver's seat; and
a controller, connected to the communication circuit, for providing an output command to the communication circuit to selectively output one of the first request signal and the second request signal, wherein the controller:
checks, when an ID code is returned from the portable device in response to the first request signal, whether the ID code is authentic;
enters an enable mode when the ID code is authentic and enables starting of the engine or normal driving of the vehicle;
detects whether or not the door is closed while the second request signal is output within the second communicable region that is in a passenger compartment of the vehicle, to be received by the portable device within the passenger compartment of the vehicle, from the communication circuit; and
skips entering the enable mode when detecting that a timing transmission of the request signal within the passenger compartment at least partially overlaps with a period in which the door is not closed while the second request signal is output within the second communicable region that is in the passenger compartment of the vehicle from the communication circuit.

12. The vehicle control device according to claim 11, wherein the controller skips entering the enable mode when detecting that the door is open and disables starting of the engine or restricts normal driving of the vehicle.

13. The vehicle control device according to claim 11, wherein the controller:
checks whether or not the ID code returned from the portable device in response to the second request signal is authentic when detecting that the door is closed; and
enters the enable mode enabling starting of the engine or normal driving of the vehicle when the ID code is authentic.

14. The vehicle control device according to claim 1, wherein the communication circuit comprises a first transmitter circuit, a second transmitter circuit, and a receiver circuit.

15. The vehicle control device according to claim 3, wherein the communication circuit comprises a first transmitter circuit, a second transmitter circuit, and a receiver circuit.

16. The vehicle control device according to claim 4, wherein the communication circuit comprises a first transmitter circuit, a second transmitter circuit, and a receiver circuit.

17. The vehicle control device according to claim 5, wherein the communication circuit comprises a first transmitter circuit, a second transmitter circuit, and a receiver circuit.

18. The vehicle control device according to claim 9, wherein the communication circuit comprises a first transmitter circuit, a second transmitter circuit, and a receiver circuit.

19. The vehicle control device according to claim 11, wherein the communication circuit comprises a first transmitter circuit, a second transmitter circuit, and a receiver circuit.

\* \* \* \* \*